United States Patent [19]
Frutiger et al.

[11] 3,745,534
[45] July 10, 1973

[54] APPARATUS FOR SELECTIVELY COUPLING ELECTRICAL SIGNALS AND SCANNING AND RECORDING DEVICES TO MOVABLE DATA CARRIERS

[75] Inventors: Peter Frutiger, Wangen near Dubendorf; Rolf Schuler, Cham, both of Switzerland

[73] Assignee: Anstalt Europaische Handelsgesellschaft, Vaduz, Liechtenstein

[22] Filed: Dec. 9, 1970

[21] Appl. No.: 96,301

[30] Foreign Application Priority Data

Dec. 11, 1969 Switzerland ........ 18466/69

[52] U.S. Cl. ........ 340/172.5
[51] Int. Cl. ........ G06f 3/08, G11b 13/00
[58] Field of Search ........ 340/172.5; 179/100.2 E; 346/44, 66

[56] References Cited

UNITED STATES PATENTS

| | | | |
|---|---|---|---|
| 2,686,057 | 8/1954 | Woolf | 179/100.2 E |
| 3,461,429 | 8/1969 | Gray | 340/172.5 |
| 3,585,597 | 6/1971 | Holmerud | 340/172.5 |
| 3,129,409 | 4/1964 | Perley | 340/172.5 |
| 2,609,050 | 9/1952 | Roth | 340/172.5 X |
| 2,939,116 | 5/1960 | Burns et al. | 340/172.5 X |
| 2,957,162 | 10/1960 | Hunt, Jr. et al. | 340/172.5 |
| 3,031,647 | 4/1962 | Dirks | 340/172.5 |
| 3,037,193 | 5/1962 | Barbagallo et al. | 340/172.5 |
| 3,155,940 | 11/1964 | Taylor | 340/172.5 |
| 3,170,143 | 2/1965 | Royston | 340/172.5 |
| 3,260,340 | 7/1966 | Locklar et al. | 340/172.5 |
| 3,365,705 | 1/1968 | Lux et al. | 340/172.5 |
| 3,490,004 | 1/1970 | Ross | 340/172.5 |

*Primary Examiner*—Paul J. Henon
*Assistant Examiner*—Melvin B. Chapnick
*Attorney*—Ostrolenk, Faber, Gerb & Soffen

[57] ABSTRACT

Apparatus for selectively inputting, transcribing and reading out to and from moving data carriers, comprising a moving magnetic film carrier having at least one recording and read-out mechanism, with feed means serving to advance the magnetic film carrier. Series-parallel converter means and switch means serve to selectively connect the recording and read-out mechanism with at least one scanner device for perforated information carriers as well as with at least one input or output location for electrical signals. There is also present means for driving the series-parallel converter means substantially in synchronism with the feed means for the magnetic film carrier.

5 Claims, 6 Drawing Figures

PATENTED JUL 10 1973 3,745,534

SHEET 1 OF 4

INVENTORS
PETER FRUTIGER
ROLF SCHULER
BY
Ostrolenk, Faber, Gerb & Soffen
ATTORNEYS INVENTORS
PETER FRUTIGER
BY ROLF SCHULER
Ostrolenk, Faber, Gerb & Soffen
ATTORNEYS INVENTORS
PETER FRUTIGER
ROLF SCHULER
BY
Ostrolenk, Faber, Gerb & Soffen
ATTORNEYS INVENTORS
PETER FRUTIGER
ROLF SCHULER
BY
Ostrolenk, Faber, Gerb & Soffen
ATTORNEYS

APPARATUS FOR SELECTIVELY COUPLING ELECTRICAL SIGNALS AND SCANNING AND RECORDING DEVICES TO MOVABLE DATA CARRIERS

BACKGROUND OF THE INVENTION

The present invention relates to a new and improved apparatus for the selective infeed, transcribing and read-out of data to and from, respectively, moving data or information carriers.

The present day automatic control of numerous operations which are carried-out by machines or automatically, starting with writing operations, for instance, at typewriters and teleprinters, extending to the control of machine tools in entire production lines, is no longer conceivable without resorting to the use of information or data carriers which are automatically or mechanically read.

Depending upon their character, it is possible to differentiate between two basically different types of data or information carriers, namely such carriers where once the information or data has been introduced it can no longer be eradicated or at least no longer eradicated without undertaking further operations, and those where the information or data can be introduced a random number of times. Belonging to the first class are the perforated data carriers, for instance, punched cards and punched tapes, and to the second class, the so-called magnetic film carriers, for instance, magnetic tapes, magnetic disks and the like.

Both of these types of information or data carriers have their advantages and drawbacks as is well-known to those familiar therewith. Moreover, owing to these known advantages and disadvantages of such data carriers, the practice has been adopted in the art to use for certain operations practically only information carriers of the one type or the other.

Magnetic film carriers are particularly suitable for high data density per surface unit or per unit of the area occupied by the data carrier itself. Therefore, they are convenient to use and, additionally, owing to the worldwide use of the so-called recording tape are relatively easy and inexpensive to acquire. On the other hand, this type of data carrier requires a great amount of electrical circuitry and complicated circuit design for the infeed, read-out and evaluation or handling of the information. It is not possible to determine with the naked eye the presence of information and the exact localization of information at a certain location on the carrier is not possible at all.

On the other hand, the characteristics of perforated information carriers are somewhat in contrast to those of the magnetic film carriers, namely, in that perforated carriers provide a relatively small data density, are less easy to handle, but are simpler to fabricate and evaluate. The presence of information or data on carriers of the perforated type is immediately ascertainable and a certain location can be immediately and exactly pinpointed to a fraction of millimeters.

SUMMARY OF THE INVENTION

Accordingly, there is still present a need in the art for equipment for the selective infeed, transcription and read-out of data to and from moving data carriers which is not associated with the aforementioned drawbacks of the prior art constructions. Hence, a primary objective of this invention is to provide such type equipment which overcomes, to a large extent, the aforementioned drawbacks of the prior art hardware and which reliably and effectively fulfills an existing need in the art.

Another more specific object of the present invention aims at providing an apparatus of the type mentioned above which avoids the drawbacks of one type of data carrier by utilizing the advantages of the other type of data carrier.

Therefore, a still further important object of the present invention which is particularly directed at fulfilling the existing need of the art concerns the provision of an apparatus of the character heretofore described at which data can be selectively read-in and read-out both at magnetic film carriers as well as at perforated data carriers and wherein the data or information also can be transcribed from one to the other carrier.

Now, in order to implement these and still further objects of the invention, which will become more readily apparent as the description proceeds, the apparatus of the present invention is generally manifested by the features that at least one recording-and read-out device for a moving magnetic film carrier can be selectively connected through the agency of a series-parallel converter driven synchronously with the feed drive for the magnetic film carrier, by means of switching means to at least one perforator and at least one reading device for a punched information carrier, as well as with at least one input- and output-location for electrical pulses.

There is advantageously employed as the magnetic film carrier a magnetic tape mounted in a cartridge or cassette. Moreover, in this connection, the recording- and read-out device for the recording tape is advantageously of a multiple-track construction.

BRIEF DESCRIPTION OF THE DRAWINGS

The invention will be better understood and objects other than those set forth above, will become apparent when consideration is given to the following detailed description thereof. Such description makes reference to the annexed drawings wherein.

Figure 1:
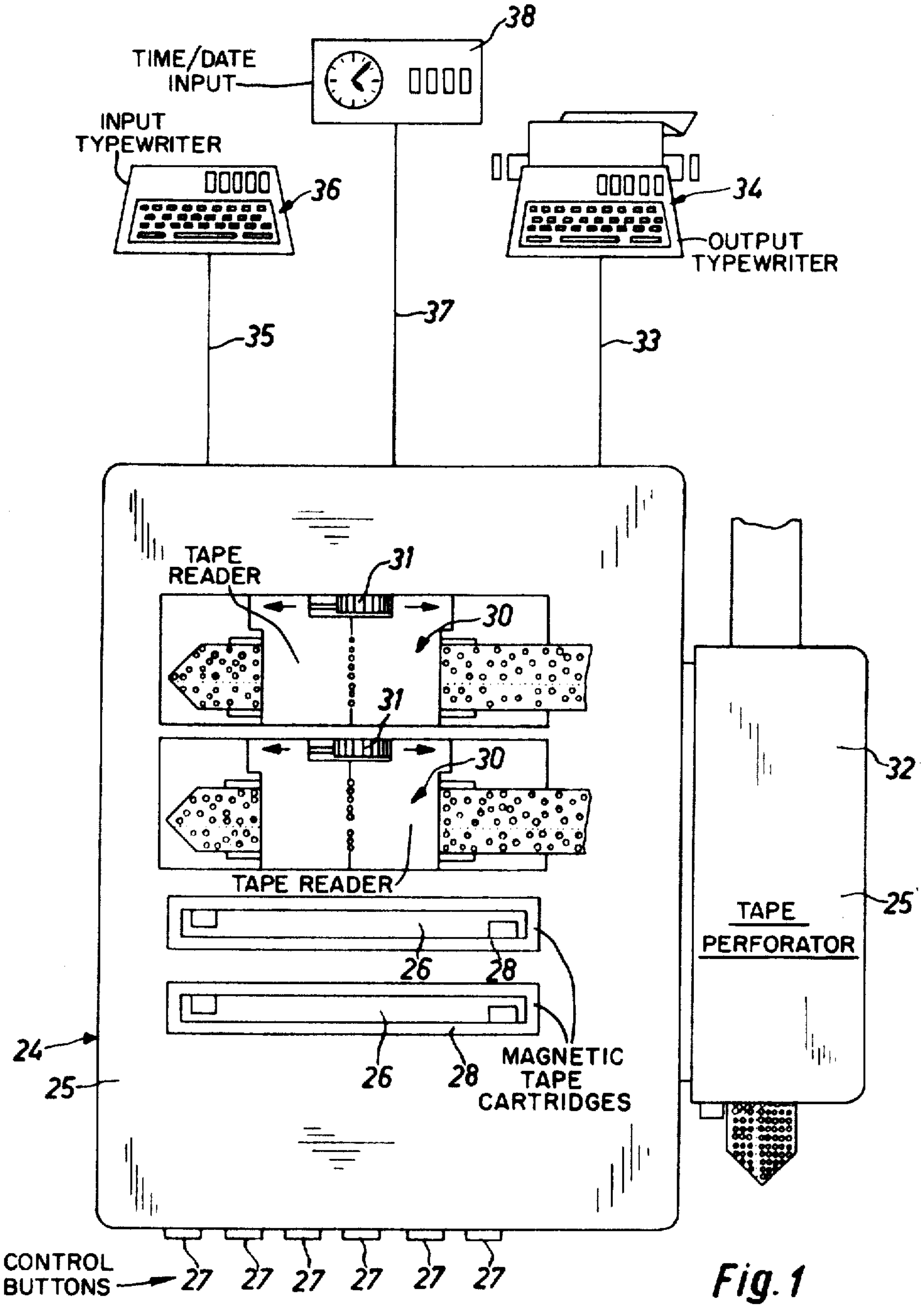
FIG. 1 is a top plan view of a first embodiment of the invention incorporating two magnetic tape cartridges and two perforated tape readers, as well as the machines connected to the apparatus or controlled by the apparatus or controlling the apparatus.

DETAILED DESCRIPTION OF THE PREFERRED EMBODIMENTS:

Describing now the drawings, and in particular, directing attention to the exemplary embodiment of inventive apparatus 24 depicted in FIG. 1, it is to be understood that such apparatus accommodates in a common housing 25 all of the circuit components which will be considered more fully hereinafter in conjunction with the remaining FIGS. 2 to 6 inclusive. Housing 25 possesses two slots or recesses 28, each of which receive a magnetic tape cartridge 26, and specifically, upon introducing such cartridge into the corresponding opening or recess 28 the magnetic tape component of the apparatus is automatically switched-in in a manner well-known to those versed in the art. At any suitable location, for instance, at the front face of the housing 25 appearing at the bottom of the illustration of FIG. 1 there are provided the control or operating knobs 27 for the switch structures 8, 13 and 16 to be more fully considered in conjunction with the description of FIG. 2, as well as for the selective switching to one of a number of external infeed locations, or for switching the desired mode of operation (recording or reproduction of a magnetic tape-portion) as well as for the switching-in and switching-out of the power supply for the apparatus which has not been particularly illustrated.

Apart from the above structure, there are provided at the apparatus 24 two conventional type and well-known punched or perforated tape readers 30, the punch tape drive mechanism of which can be reversed by means of a switch 31 so that the perforated or punched tapes can be introduced from one or the other side and/or can be read forwards or rearwards.

A punch tape perforator 32 is provided laterally at the housing 25 and is covered by a removable protective cover 25'.

Coupled with the apparatus 24 are different machines which deliver information or data to or require data or information from apparatus 24. For instance, in the exemplary embodiment under consideration there is connected with the apparatus 24 through the agency of a multiconductor 33 (corresponding to the number of digits of the code which is to be used) an electrical typewriter or teleprinter 34 which can be controlled by the data carrier, and via a conductor 35 an infeed keyboard 36 constituting part of a further typewriter. From what has been stated above, it will be apparent that in the exemplary embodiment under consideration the apparatus 24 is used as a component of an automatic recording device.

Now, in automatic recording or writing devices a prepared text, present in a single or different combination variations, is to be clearly transcribed or written-out in a large number of originals sent to different receivers. In so doing, it is desirable to create the impression of a personal letter, which otherwise cannot be obtained in the case of a printed text or a multiple-copied text.

Furthermore, with an automatic recording or writing device, it is possible to rationally and quickly compose into letters repeating, similar or identical text groups in different combinations.

Hereinafter in conjunction with the apparatus construction depicted in FIG. 1 there will be described different phases of the course of operation of the automatic recording or writing device which can be realized with the use of the inventive apparatus.

The first phase of operation resides in having the operator type in all of the text information in sections at the keyboard 36, whereby there is simultaneously produced along with the print-out at location 36, a first perforated tape at the perforator 32.

During the second phase of operation, the first perforated tape is introduced into one of the scanners or readers 30 and the entire previously produced perforated tape is passed through the reader at a maximum writing speed. In so doing, the perforator 32 simultaneously produces a duplicate tape and the typewriter 34 types along therewith. However, the operator has previously noted all of the typing errors at the first print-out. This operator then reads the new print-out and now stops the automatic typing device each time when approaching an error, in order to cause it to travel further through individual steps until reaching the actual location of the error. Then, the new error-free passage is typed in and conjointly punched-out at the duplicate tape or strip and the perforated or punched tape possessing errors is permitted to travel across the error location without controlling the typewriter 34. As a general rule, complete words are corrected since the signal "intermediate space" can be easily optically recognized at the perforated tape.

It is also possible to return an errored character which has been overlooked and which has moved beyond the reading position by a number of characters, beneath the stamping die by individually backstepping in stepwise fashion, the perforated duplicate tape or strip and by carrying-out a number of complete perforations (which in most of the multiple step codes do not trigger any printing operation) to eradicate the source of the error and thereafter to punch in the corrected character or text.

The third phase of operation entails a control through-travel of the now correct duplicate tape, possibly while simultaneously fabricating a still further duplicate tape which can take-up still additional corrections.

In the fourth phase of operation, this final perforated tape, after having been inserted into one of the scanners or readers 30, is transcribed or re-recroded at a magnetic tape cartridge 26. In so doing, the synchronously operating multiple-track recording at the magnetic tape is transformed, which can be undertaken by means of the series-parallel converter which will be considered further in conjunction with the additional figures, and which in this case functions as a parallel-series converter, whereby then in a single-tone telegraph process the logging at the magnetic tape occurs in the cartridge. If there is carried out a re-recording at increased speed, then the pulse sequence of the dual pulses is already sufficient as such for direct logging since their frequency, owing to the re-recording speed, is high enough to obtain a direct inducing of the information via the magentic head upon the magnetic tape. In so doing, certain sections can be indicated at a second track either by certain pulse groups, by special frequencies, or by marks. Since during re-recording no writing operation is carried-out at one of the typewriters or writing machines 34,36, it is possible to employ re-recording speeds which amount to a multiple of the maximum possible clear text writing speed, so that re-recording can occur without any great loss in time. It is possible to prepare, for instance, address cartridges, in the same manner.

The phase concerning automatic print-out of letters can be described as follows: An assistant can either control in sections the data carrier introduced into the apparatus by means of the keyboard 36 with the aid of a table of contents or index, or it is also possible to prepare further so-called programmed perforated tapes which again are inserted into the scanner or reader 30 in order to control the course of operation which, for instance, can be represented as follows:

$$428 \times 215 \times 31 \times 42 \times 55 \times 8$$

Each group of numbers of this control command portrayed in digit form represents a certain section of the text which should be removed from one of both tape cartridges. In this connection, it is mentioned that a known electronic control provided for the apparatus automatically accelerates the magnetic tapes in the cartridges and displaces them to such an extent until the relevant section of the tape appears at the neighborhood of the reading head. Thereafter, the typewriter or recording machine is coupled-in and the tape feed mechanism is adjusted to the writing speed until the relevant text passage has been printed or written out.

If it is necessary to apply to the print-out the date, this can be advantageously undertaken by a fully automatic date printer 38 (FIG. 1) which is now conventionally provided in conjunction with automatic writing or printing devices and which is connected to the apparatus by line 37 and can be automatically controlled or adjusted manually.

Having now had the benefit of the foregoing discussion, there will be hereinafter described in conjunction with FIGS. 2 to 6 the circuitry for the apparatus of the invention, whereby, however, in order to preserve clarity in illustration and for the sake of simplicity there has only been shown one magnetic tape cartridge as well as one perforated tape reader, and there is likewise mentioned that in the illustration under consideration there is used a three-digit code. It should be expressly understood, however, that those skilled in the art will readily appreciate that the circuitry described in conjunction with FIGS. 2 to 6 inclusive can be complemented with a second magnetic tape cartridge arrangement and a second perforated tape reader.

Figure 2:
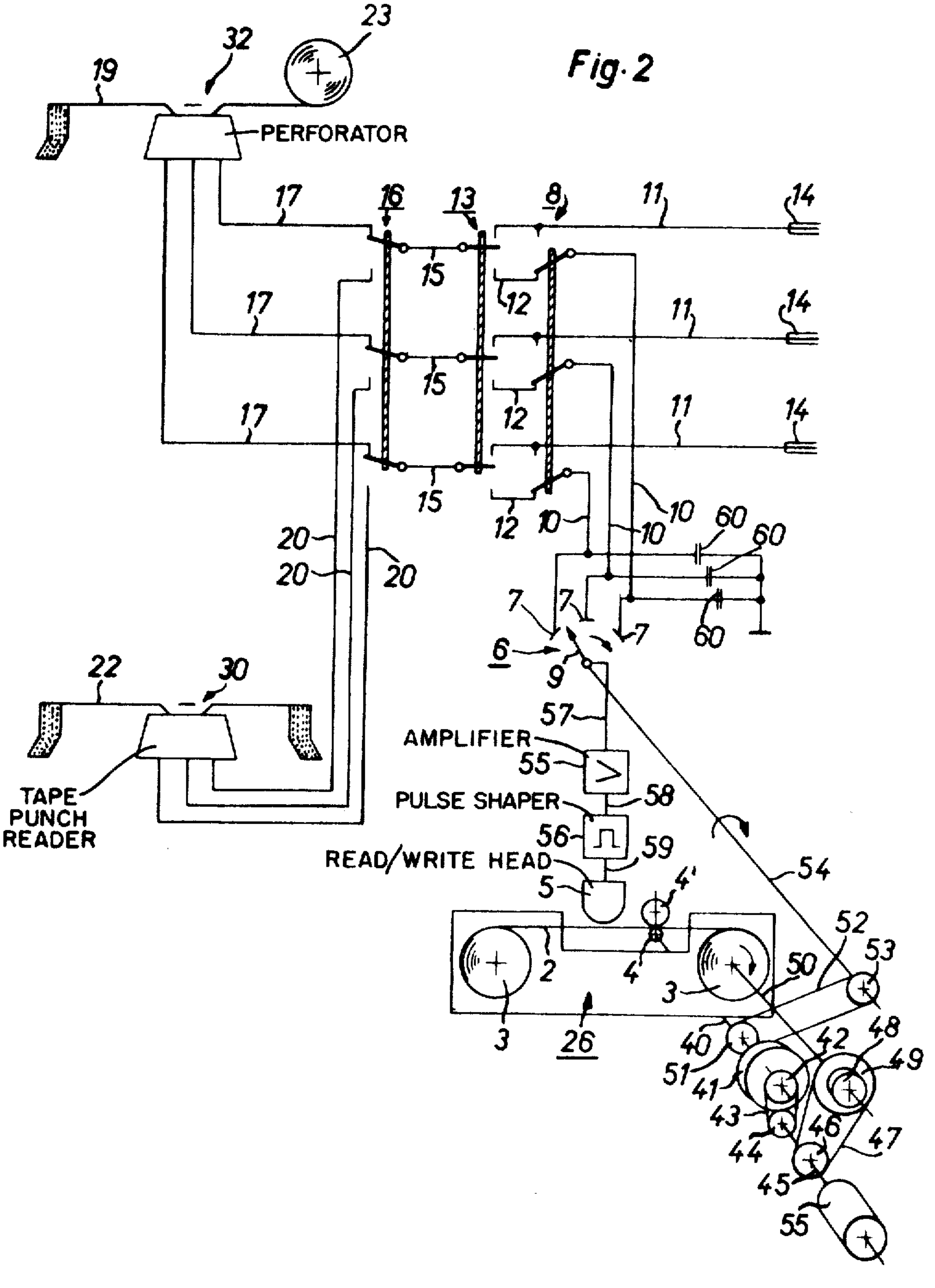
FIG. 2 is a markedly simplified schematic diagram of one form of inventive apparatus.

By referring now to FIG. 2, there will be recognized one of the magnetic tape cartridges 26 in which there is arranged between two spools 3,3 a windable magnetic tape 2. The free section of the magnetic tape 2 extending between the spools 3 is guided between a pair of drive rolls 4,4' and moves past a recording- and read-out head 5.

The driven roller 4 of the roller pair 4,4' is mounted for rotation upon a shaft 40, which is further provided with a flywheel 41 as well as a belt pulley 42 about which there is entrained the drive pulley belt 43. This drive pulley belt 43 leads to a further belt pulley 44 mounted for rotation upon a shaft 45 coupled in driving relationship with a drive motor 55. This drive motor 55 is advantageously a stepping motor, and will be considered more fully in conjunction with FIG. 5. Furthermore, upon the shaft member 45, there is arranged a still further belt pulley 46 which leads via an elastic belt 47 to a belt pulley 49 driving a shaft 50 by means of a slip coupling mechanism 48. The shaft member 50 is coupled with the wind-up spool 3 at the right-hand of the magnetic tape cartridge.

From what has been described heretofore, it will be recognized that the feed or advance of the magnetic tape 2 is solely dependent upon the rotational speed of the drive motor 55, whereas the driving force taken-off via the slip coupling mechanism 48 only serves to wind-up upon the right-hand side located spool 3 the free section of which has been advanced by the pair of rollers 4,4'.

A further belt pulley 51 is mounted for rotation upon the shaft member 40 which is coupled by means of a belt 52 to a similar size belt pulley 53 provided on shaft 54, shaft 54 serving to drive the movable contact member 9 of a series-parallel converter 6.

Now, by referring again to FIG. 2, it will be seen that the series-parallel converter 6 is electrically coupled via a conductor 57, an amplifier 55, a conductor 58, a pulse shaper 56 and a further conductor 59 to the output of the recording-and read-out head 5. The pulse shaper 56 and the amplifier 55 are standard and well-known circuit components, so that it is unnecessary to more fully consider same. They serve the purpose to uniformly amplify the information which has been inductively read-off of the tape 2 by the head 5. This information consists of bits which are removed successively in time from the tape. The series-parallel converter 6 serves the purpose of distributing in groups to a number of channels, in this case three, the information bits which have been read-out from the tape one after the other in time, and from which channels the thus formed information group can be simultaneously and totally again removed.

Now, to this end, there are arranged in the series-parallel converter 6 a movable contact element 9 and three contact segments 7 (corresponding to the number of places) which are wipingly contacted by the contact element 9. Each of these contact segments or tracks 7 is connected with one pole or terminal of a respective one of three capacitors 60, the other pole of each such capacitor being connected to ground. These capacitors 60 serve as storage elements.

Now, if, for example, the reading head 5 has read-off of the tape 2 a bit, then this bit appears in the form of a voltage pulse at the contact element 9 and at the contact segment 7 contacted by such contact element, so that the capacitor coupled with this segment 7 is charged. Also, however, the conductor 10 associated with the capacitor 60 has voltage applied thereto, even if the movable contact element 9 has already wipingly contacted the next contact track 7. Since the tape 2 and the contact element 9 are driven in the described manner, it is ensured that the speed of rotation of the series-parallel converter 6 and the feed velocity of the tape 2 are in a constant relationship to one another.

As already explained, a conductor 10 is coupled electrically with each capacitor 60, this conductor leading to the movable contact of a three-pole reversing switch 8. By means of this reversing switch 8, it is possible to connect the conductors 10 either to an associated one of the same number of conductors 11 leading to the connection sleeves or terminals 14, or else, however, to an associated one of three shunt lines or conductors 12. There is additionally provided a further three-pole reversing switch 13, the movable contacts of which likewise can be selectively connected to the conductors 11 or to the shunt lines 12.

The movable contacts of the reversing switch or switch mechanism 13 are connected through the agency of intermediate conductors 15 with the movable contacts of a third three-pole reversing switch mechanism 16. This reversing switch mechanism 16 is provided with contacts connectible either to the conductors 17 or the conductors 20. The conductors 17 lead to the previously discussed tape perforator 32 where data is punched into the punch tape 19 in accordance with the pulses delivered to the conductors 17, this punch tape 19 being payed-off from the supply roll 23. On the other hand, the conductors 20 lead to the perforated tape reader or scanner 30 which serves to scan data from the perforated tape 22 and to deliver the scanned information in the form of pulses to the conductors 20.

Both the tape perforator or puncher 32 as well as the perforated tape reader 30 are, as already mentioned heretofore, components which are well-known in this art so that it is unnecessary to further discuss same.

When the switches 8, 13 and 16 are in the position illustrated in FIG. 2, the apparatus is placed out of operation, that is all of the input and output lines do not lead anywhere, that is, are open.

Now, if the movable contacts of the switch mechanism 13 are displaced out of the position illustrated in FIG. 2 and are moved downwardly, then the portion of the apparatus associated with the recording trape 2 is connected with the tape perforator 32. With this switching position of the equipment, it is possible to transcribe data or information from the storage capacitors 60 and therefore from the recording tape 2 onto the perforated tape 19.

On the other hand, if the movable contacts of the switching mechanism 13 are switched upward, then the tape perforator 32 is connected with the connection terminals or sleeves 14 and the apparatus will now record at the perforated tape information delivered from the outside, that is, for instance, from a computer.

If the movable contacts of the switching mechanism 8 are displaced from the switching position depicted in FIG. 2 upwardly, then, the apparatus functions as a data storage with the magnetic tape 2 serving as the data carrier, with the connection terminals 14 forming the inputs or outputs of the apparatus, depending upon the switched mode of operation (recording or reproduction) of the head 5.

If the movable contacts of the switching mechanism 16 are switched-out of the illustrated switching position, and are moved downwardly, then the perforated tape reader or scanner 30 of the apparatus is activated, and by means of the switch mechanisms 13 and 8 the perforated tape reader 30 can be connected to the connection terminals 14 and/or to the sound head 5.

The embodiment of the invention depicted by way of example in FIG. 2 operates, as already explained, with a three-digit perforated tape code. If it is desired to operate with the presently widely used five-digit or seven-digit punched tape or perforated tape code then, of course, there should be employed a one-in-five or a one-in-seven series-parallel converter or transformer which is operable from both sides. The conductor groups 10, 11, 12, 15, 17 and 20 will then respectively include five or seven, individual lines and the switches 8, 13 and 16 will then be equipped with five or seven poles, respectively.

A further possibility of operating with a perforated tape code possessing more than for instance three digits or places resides in using a recording tape- recording and read-out head possessing more than one track. Such circuit variation has been described in conjunction with FIGS. 3 and 4 which will now be considered.

Figures 3, 4, 5:
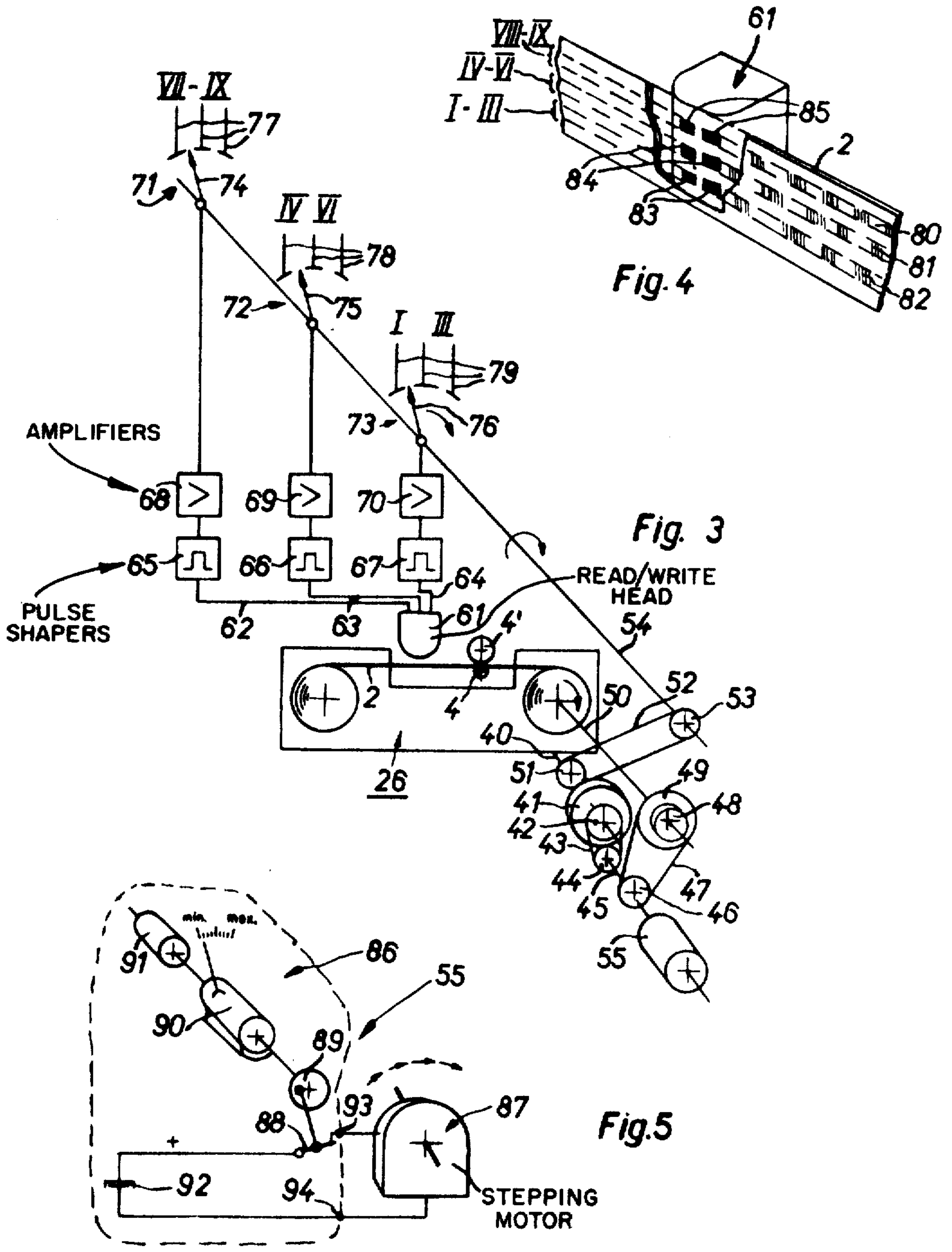
FIG. 3 is a simplified schematic diagram of the embodiment of FIG. 1, which is equipped with a three-track logging or recording- and read-out head.
FIG. 4 is a schematic front view of the three-track logging- and read-out head showing a section of the magnetic tape which is introduced thereto.
FIG. 5 is a schematic view of the stepping motor provided for the feed of the magnetic tape.

By referring now to the lower portion of the circuitry of FIG. 3, there will be recognized the same components as appeared in the arrangement of FIG. 2, and therefore, by way of convenience in illustration the same reference characters have been used to conveniently designate similar or analogous elements. The difference with this arrangement from that of FIG. 2 resides in the fact that the combination recording and read-out head 61 associated with thr recording tape 2 possesses three-tracks. Now, as best illustrated by referring to FIG. 4, with such type head 61 there is simultaneously recorded or read-out, on or from, respectively, the tape 2 three tracks 80, 81 and 82 by means of the magnetic pole pairs 83, 84 and 85. Each of the tracks 80, 81 and 82 is provided at the sound head 61 with a respective conductor 62, 63 and 64 leading via a respective pulse shaper 65, 66, 67 and a respective amplifier 68, 69 and 70 to the respective movable contact elements 74, 75 and 76 of a respective three-pole series-parallel converter 71, 72 and 73, respectively. At the output side of these series-parallel converters 71, 72 and 73 there are thus available a total of nine conductors, each one of which is associated with one place or digit of the perforated tape code which is used. Such has been indicated in FIGS. 3 and 4 by the reference characters I–IX.

As should be readily understood from what has been discussed above, the total of nine conductors leading from the contact segments 77, 78 and 79 of the series-parallel converters 71, 72 and 73 of the arrangement of FIG. 3, similar to the arrangement of FIG. 2, lead to a reversing switch mechanism which, however, in this case constitutes a nine-pole reversing switch mechanism (not shown), and moreover, as should be equally readily understood the remaining portion of the apparatus of FIG. 3 is in principle similarly constructed as the apparatus construction of FIG. 2 with the exception that all conductors are designed to constitute nine in number and the switching devices or mechanisms are designed to possess nine poles for obvious reasons. Hence, with this arrangement, the apparatus of FIG. 3 is useful for a perforated tape code having up to nine digits or places.

It has already been mentioned that it is desirable that motor 55 advantageously be a stepping motor having a variable stepping frequency. One such type of stepping motor which can be advantageously employed with the invention has been shown in FIG. 5. The motor of FIG. 5 comprise a pulse generator portion 86 and the actual stepping motor 87. The pulse generator portion 86 include a switch 88 which is periodically actuated by a continuously rotating motor 91 through the agency of a variable transmission 90 and a crank drive 89. Consequently, the output terminals 93 and 94 are periodically coupled electrically with a suitable current source 92.

Now, at the output terminals 93 and 94, there is electrically connected the stepping motor 87 which can be of conventional design, such as for instance, the type of stepping motor available on the market from Sigma Corporation and sold under its trademark "CYCLONOME".

Since the perforated tape must be advanced both in the perforator as well as in the reader in a stepwise, and specifically, with a stepping frequency wherein each step or increment corresponds to a complete rotation of the series-parallel converter 6, or 71, 72, 73, respectively, the drive for the series-parallel converter mechanisms must be coupled with the feed or advancing drive for the perforated tape.

Figure 6:
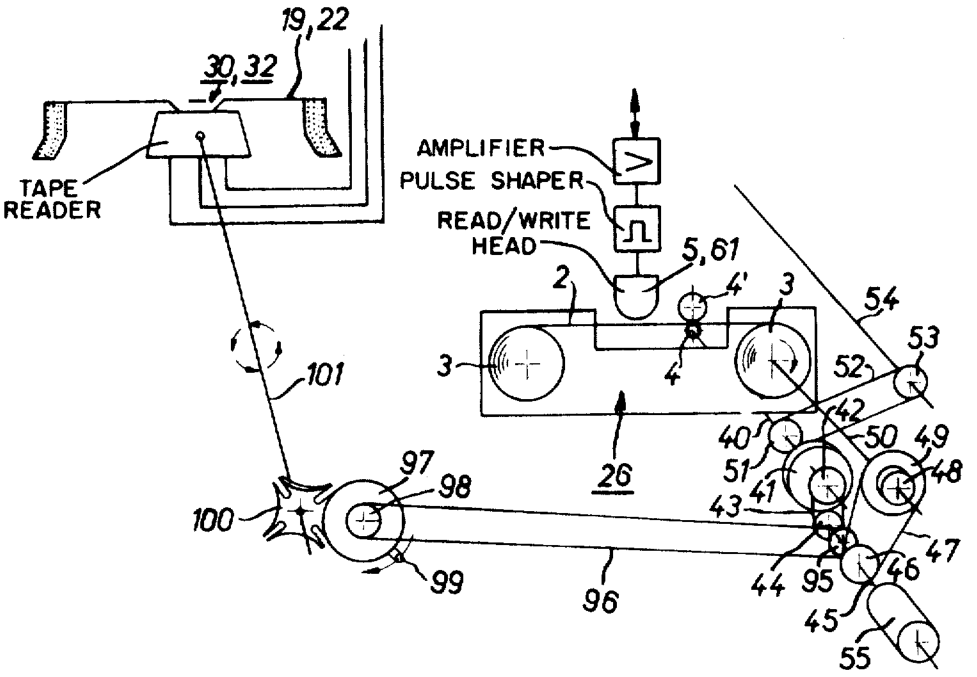
FIG. 6 is a schematic illustration of the coupling of the feed drive for the magnetic tape with the feed drive of the perforated tape reader or perforator.

One possibility of achieving this result has been indicated in FIG. 6, wherein for purposes of explanation the essential components of the mechanical drive of the apparatus of FIGS. 2 and 3 have again been illustrated and designated with like reference characters. It will be seen that upon the shaft 45 there is here mounted or keyed an additional pulley disk 95 which drives a further pulley disk 98 through the agency of a belt 96. The belt pulley or disk 98 is keyed to the blocking disk 97 of a Maltese cross-indexing mechanism or Geneva indexing device 100, which disk 97 carries an indexing pin member 99. The Maltese cross-indexing mechanism 100 is mounted for rotation upon shaft 101 which controls the feed or advancing mechanism of the tape perforator 32 and the tape reader 30, respectively.

From what has been stated above, it will be recognized that for each revolution of the shaft member 45 and therefore also the shaft 54 driving the series-parallel converter means, the shaft member 101 and therefore also the perforated tapes 19, 22 are further transported or advanced through one indexing step or stepping increment.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for the selective input and read-out of data respectively to and from data carriers and for the transcribing of data from a data carrier of one type to a data carrier of another type, comprising a moving magnetic data carrier containing a magnetic tape and having at least one recording and read-out mechanism for recording and reading data from the magnetic tape in serial fashion; drive means for advancing the magnetic tape in said magnetic data carrier; at least one scanner device for reading perforated data carriers; at least one perforator device for punching perforated data carriers; input/output terminals for respectively coupling electrical signals to or from external sources with said apparatus; series-parallel converter means connected to said recording and read-out mechanism; switch means coupled to said converter means; means for operating said series-parallel converter means continously and in exact synchronism with said drive means for advancing said magnetic tape to eliminate the need for additional intermediate buffer storage means; said switch means including a first group of switches for selectively connecting said converter means to said input/output terminals, and a second group of switches for selectively connecting one of said scanner and perforator devices to one of said input/output terminals and said first group of switches.

2. The apparatus as defined in claim 1, wherein said recording and read-out mechanism serves to cooperate with at least one magnetic tape disposed in a cartridge, said recording and read-out mechanism comprising a multiple-track recording and read-out head, channel means associated with each track, said series-parallel converter means comprising individual series-parallel converters corresponding in number to the number of said tracks, each one of said channel means associated with a track being connected with one of said series-parallel converter means.

3. The apparatus as defined in claim 2, wherein said drive means for advancing the magnetic film carrier comprises a stepping motor equipped with a power supply, and means for varying the frequency of the power supply of said stepping motor.

4. The apparatus as defined in claim 1, wherein said groups of switches are each comprised of multi-pole switch mechanisms wherein the number of poles of said switch mechanisms is at least equal in number to the number of information tracks associated with said tape perforator means and said scanner device.

5. The apparatus as defined in claim 1, further including a feed drive mechanism for the perforated information carrier, and an indexing mechanism for operably connecting said drive drive mechanism with said feed means for advancing said magnetic film carrier.

* * * * *